United States Patent
McDonald

(10) Patent No.: US 11,614,944 B2
(45) Date of Patent: Mar. 28, 2023

(54) SMALL BRANCH PREDICTOR ESCAPE

(71) Applicant: CENTAUR TECHNOLOGY, INC., Austin, TX (US)

(72) Inventor: Thomas C. McDonald, Austin, TX (US)

(73) Assignee: CENTAUR TECHNOLOGY, INC., Austin, TX (US)

(*) Notice: Subject to any disclaimer, the term of this patent is extended or adjusted under 35 U.S.C. 154(b) by 0 days.

(21) Appl. No.: 17/092,668

(22) Filed: Nov. 9, 2020

(65) Prior Publication Data

US 2022/0147360 A1 May 12, 2022

(51) Int. Cl.
*G06F 9/38* (2018.01)

(52) U.S. Cl.
CPC .......... *G06F 9/3844* (2013.01); *G06F 9/3848* (2013.01)

(58) Field of Classification Search
CPC .............................. G06F 9/3848; G06F 9/3844
See application file for complete search history.

(56) References Cited

U.S. PATENT DOCUMENTS

| | | | | |
|---|---|---|---|---|
| 5,933,628 A * | 8/1999 | Chang | | G06F 8/447 712/233 |
| 2001/0016903 A1 * | 8/2001 | Tremblay | | G06F 9/3844 712/239 |
| 2001/0047467 A1 * | 11/2001 | Yeh | | G06F 9/3806 712/228 |
| 2002/0188834 A1 * | 12/2002 | McDonald | | G06F 9/3806 712/238 |
| 2005/0268076 A1 * | 12/2005 | Henry | | G06F 9/3844 712/239 |
| 2011/0055529 A1 * | 3/2011 | McDonald | | G06F 9/30054 712/238 |
| 2015/0363201 A1 * | 12/2015 | Eickemeyer | | G06F 9/30061 712/239 |
| 2016/0357561 A1 * | 12/2016 | Greenhalgh | | G06F 9/30101 |
| 2018/0101385 A1 * | 4/2018 | Wang | | G06F 9/3848 |
| 2018/0165094 A1 * | 6/2018 | Bonanno | | G06F 9/3848 |
| 2018/0349144 A1 * | 12/2018 | Pal | | G06F 9/3848 |
| 2019/0213008 A1 * | 7/2019 | Bhat | | G06F 9/3806 |
| 2019/0317769 A1 * | 10/2019 | Hu | | G06F 9/3848 |
| 2019/0361707 A1 * | 11/2019 | Vougioukas | | G06F 9/30145 |
| 2020/0401409 A1 * | 12/2020 | Dundas | | G06F 9/381 |

* cited by examiner

*Primary Examiner* — Keith E Vicary
(74) *Attorney, Agent, or Firm* — McClure, Qualey & Rodack, LLP

(57) ABSTRACT

In one embodiment, a branch prediction control system is configured to move a mispredicted conditional branch from a smaller cache side that uses the lower complexity conditional branch predictor to one of the two large cache sides that uses the higher complexity conditional branch predictors. The move (write) is achieved according to a configurable probability or chance to escape misprediction recurrence and results in a reduced amount of mispredictions for the given branch instruction.

18 Claims, 5 Drawing Sheets

SMALL BRANCH PREDICTOR ESCAPE

TECHNICAL FIELD

The present invention relates in general to microprocessors, and in particular, branch prediction in microprocessors.

BACKGROUND

Microprocessors today operate using a pipelined processing scheme whereby programming instructions are broken down into steps that are carried out concurrently throughout a plurality of stages of the pipeline. Instructions typically (e.g., 10-20% of programming code) comprise branch instructions, or simply branches, which include unconditional branches (e.g., branches that are always taken) and conditional branches (e.g., taken or not taken depending on evaluation of a specified condition). It is generally not known for certain whether a conditional jump will be taken or not taken until the condition has been calculated and the conditional jump has passed the execution stage in the instruction pipeline, which may cause delays in fetching the next instruction. Branch predictors have been developed that attempt to guess, at the front end of the pipeline, which direction (taken, not taken) a conditional branch will go and to what target address, and in doing so, improve the flow of instructions through the pipeline.

One branch predictor that is commonly used in microprocessors is referred to as a branch target address cache (BTAC). The BTAC comprises hardware logic that may include the use of a global history pattern of past branch instruction behavior to enable a prediction of a target address for a fetched branch instruction. In general, branch predictors for the BTAC may comprise a plurality of predictor tables used in conjunction with plural, multi-set associative cache memories or sides often denoted by letters, such as in the case of two cache memories of the BTAC, sides A and B. Each side may comprise multiple ways (e.g., 2-way, 4-way, etc.). Information for some example BTAC arrays may be found in U.S. Pat. Nos. 8,832,418 and 7,707,397, which are incorporated herein by reference to the extent consistent with the current disclosure. For a given cache fetch (e.g., sixteen (16) byte fetch of a cache line in an instruction cache), there may be more than a single branch instruction. For a BTAC with sides A and B and a cache fetch comprising two branch instructions, information (e.g., target address, direction, etc.) for the two branch instructions may be found in sides A and B, respectively. However, though not a common occurrence, there may nevertheless be more than two branch instructions (e.g., three) in a given cache fetch, and the prediction logic of a microprocessor should be able to process these multiple branch instructions encountered in a single cache line fetch efficiently without undue delay and regardless of the branch instruction complexity.

SUMMARY

In one embodiment, a microprocessor, comprising: a table comprising multiple sides, wherein at least a first side comprises a first conditional branch predictor having a first set of prediction tables, wherein at least a second side comprises a second conditional branch predictor having a second set of prediction tables, wherein the second conditional branch predictor is configured to provide a first prediction based on a prediction table hit for a branch instruction comprising information in the second side, and wherein the first conditional branch predictor is of a greater complexity than the second conditional branch predictor; and control logic, wherein based on receiving an indication of a misprediction corresponding to the first prediction for the branch instruction, the control logic is configured to write the information for the branch instruction to one of the first set of prediction tables of the first side.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Figure 1A:
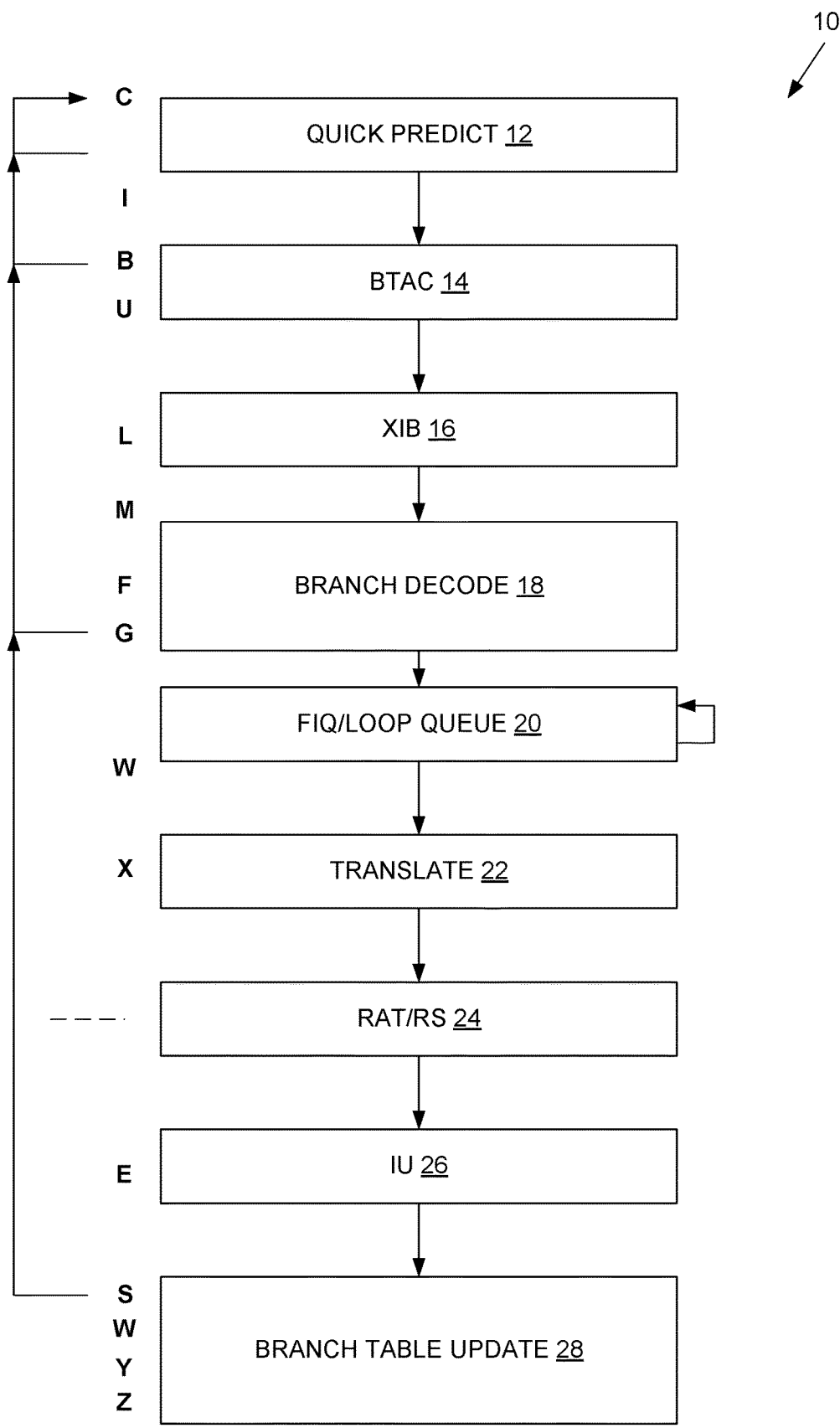
FIG. 1A is a block diagram showing an example branch unit pipeline for a microprocessor in which an embodiment of a branch prediction control system is implemented.

Certain embodiments of a branch prediction control system and method are disclosed that comprise a table having three cache memory sides that use two types of conditional branch predictors of different complexity to efficiently process three branch instructions in a single cache line fetch and/or when a more complex branch instruction is in a side with a smaller prediction table. In one embodiment, a branch prediction control system is configured to move a mispredicted conditional branch from a smaller cache side that uses the lower complexity conditional branch predictor to one of the two large cache sides that uses the higher complexity conditional branch predictors. The move (write) is achieved according to a configurable probability or chance to escape misprediction recurrence and results in a reduced amount of mispredictions for the given branch instruction.

Digressing briefly, conventional branch prediction schemes use branch prediction logic comprising a prediction logic table (e.g., branch target address cache, or BTAC) of multiple sides. Though rare, a cache line fetch that has three branch instructions may result in a prediction table hit in the three sides, respectively. The allocation of the branch instructions in the BTAC is generally in the order of occurrence in the programming code (e.g., the first branch instruction to the first side or side A, the second branch instruction in the second side or side B, and the third branch instruction to the third side or side C). However, the occurrence of three branch instructions is not common, and hence the need for the three sides to be of equal size and/or equal prediction logic complexity is unwarranted in most cases. However, reducing the size and prediction complexity for one of the sides (e.g., side C), though achieving gains in reduced complexity and improved speed of operation, may result in compromised performance when a branch instruction requiring more sophisticated branch prediction (e.g., when compared with the other two branch instructions of the cache line fetch) is located within the lower complexity side (e.g., side C). Certain embodiments of a branch prediction control system detect the situation where there is a misprediction with the offending branch instruction located in side C, and hence provide for an escape or move of the offending branch instruction from side C (lower complexity) to one of sides A or B (higher complexity) according to a configurable chance representing one of a plurality of different predefined ratios (e.g., $\frac{1}{128}$, $\frac{1}{32}$, $\frac{1}{8}$). By using a branch prediction microarchitecture with a lower branch prediction complexity, a performance gain is realized (e.g., compared to three sides using prediction functionality of equal complexity) while enabling small branch predictor escape (e.g., move to a side having more branch predictor tables using a more sophisticated branch prediction algorithm) when misprediction occurs for a given branch instruction located on side C.

Having summarized certain features of a branch prediction control system of the present disclosure, reference will now be made in detail to the description of a branch prediction control system as illustrated in the drawings. While a branch prediction control system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. For instance, though emphasis is placed below on prediction logic that has a conditional branch predictor table having three sides, it should be appreciated by one having ordinary skill in the art in the context of the present disclosure that tables with more than three sides, or only two sides, may be used and hence are contemplated to be within the scope of the disclosure. Further, though a particular embodiment is described with a tagged geometric (TAGE) predictor comprising plural tables of different complexity in each of sides A and B, and a gshare predictor comprising a single predictor table in side C, in some embodiments, there may be different types of conditional branch predictors used and hence are contemplated to be within the scope of the disclosure. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1A shows an embodiment of an example branch unit pipeline for a microprocessor 10. It should be appreciated that certain known components of a microprocessor 10 are omitted here for brevity and ease of explanation and illustration. As is known, the pipeline architecture provides for multiple instructions that are overlapped in execution, with each stage referred to as a pipe stage. The blocks shown in the branch unit pipeline may each be implemented according to one or more stages, those stages shown to the left of the blocks and represented in the depicted embodiment by the upper-case letters C, I, B, U, L, M, F, G, W, X, E, S, W, Y, and Z that are sequentially advanced from top-down and as redirected (as shown by the arrows). It should be appreciated by one having ordinary skill in the art that the number and/or arrangement of stages depicted in FIG. 1A is merely illustrative of one example embodiment, and that in some embodiments, a different number and/or arrangement of stages may be implemented and hence contemplated to be within the scope of the disclosure. It should also be appreciated by one having ordinary skill in the art that the blocks provide a general description of functionality for the branch pipeline, and that associated logic or circuitry known to those having ordinary skill in the art is omitted here for brevity. For instance, it should be appreciated by one having ordinary skill in the art that each stage of the pipeline may be separated by clocked pipeline registers or latches, as is known. As another example, though not explicitly shown in FIG. 1A, it should be appreciated by one having ordinary skill in the art that operations at the front end involve data exchange or interaction with an instruction cache.

An instruction cache is a random access memory device within a microprocessor into which the microprocessor places instructions of an ISA machine language program (such as x86 ISA machine language instructions) that were recently fetched and/or pre-fetched from larger cache (e.g., L2 cache, L3 cache) or system memory (e.g., fetched and/or pre-fetched from DRAM by a bus interface unit) and performed by the microprocessor in the course of running the ISA machine language program. The ISA defines an instruction address register that holds the memory address of the next ISA instruction to be performed (defined by the x86 ISA as an instruction pointer (IP) though sometimes referred to as a program counter (PC)), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data (i.e., that is accessed based on an instruction address register value and on a load/store address, but not exclusively based on a load/store address) is intended to be included in the definition of an instruction cache for purposes of the present disclosure.

Directing attention in particular to the branch unit pipeline of the microprocessor 10 of FIG. 1A, the microprocessor 10 comprises a pipelined microprocessor whose instruction set, in one embodiment, conforms substantially to the x86 architecture instruction set. As will be appreciated by persons having ordinary skill in the art from the description provided herein, the present invention may be implemented in a variety of various circuit configurations and architectures, and the architecture illustrated in FIG. 1A is merely one of many suitable architectures. The example microprocessor 10 comprises a quick predictor 12, branch target address cache (BTAC) 14, instruction byte queue (XIB) 16, a branch decoder 18, format instruction queue (FIQ)/loop queue 20, instruction translator 22, register alias table (RAT)/reservation stations (RS) 24, functional units (e.g., integer unit, floating point unit, etc.) 26, and a branch table updater 28. Each of the numerically-referenced blocks of the microprocessor 10 correspond to logical circuits that are implemented over the corresponding plurality of stages C, I, B, U, L, M, F, G, W, X, E, S, W, Y, and Z, with the pipeline architecture enabling different groups of instructions at every stage. In one embodiment, four or more instructions may be run at every stage, with control signals marking each stage along the pipeline. Stages in association with the quick predictor 12, BTAC 14, and XIB 16 involve accesses to an instruction cache (I-cache, not shown in FIG. 1A).

The quick predictor 12 comprises a single cycle branch predictor that provides for single cycle prediction (e.g., takes one cycle to produce a target address, the prediction provided at the I stage in one embodiment). In one embodiment, the quick predictor 12 comprises a table (also referred to herein as array or target array) that stores branch target addresses of previously executed branch instructions, the table enabling a branch prediction when the stored branch instructions are subsequently encountered. In one embodiment, the table comprises 128 entries, though tables of other sizes (e.g., 64 entries, 32 entries, etc.) may be used in some embodiments. The table is organized as an n-way (e.g., n is an integer greater than one) set associative cache. Generally, an n-way set associative cache is also referred to herein as a multi-set associative cache. In one embodiment, each entry stores eight (8), 3-bit counters and the current local branch pattern, the counter chosen by a 3-bit local branch pattern. The quick predictor 12 further comprises a conditional branch predictor that is accessed in parallel with the table and that provides a taken/not taken direction for conditional branches. The quick predictor further comprises a return stack that can provide a target instead of the table. In one embodiment, the return stack comprises four (4) entries and provides the target for return instructions. Note that the specifications listed above are merely for illustration, and that some embodiments may perform under different specifications and hence are contemplated to be within the scope of the invention. The quick predictor 12 is configured to deliver a predicted branch target immediately (within a single cycle) with no taken branch penalty. In some embodiments, the quick predictor 12 may operate according to other specifications for its prediction mechanism and/or table configuration, or in some embodiments, may be omitted. Most branches are correctly predicted by the quick predictor 12. In some embodiments, where the quick predictor 12 provides a branch prediction that differs (e.g., difference in direction and/or target) from the branch prediction of the BTAC 14 based on the same fetched branch instruction, the BTAC 14 overrides the branch prediction of the quick predictor 12 and updates the quick predictor table within the set of stages of the BTAC 14, for instance, at the U stage, with the branch prediction information (e.g., direction, target address, branch prediction type) provided by the BTAC 14.

The I stage and/or B stage correspond to access to the various tables of the branch unit pipeline, including the I-cache, tag arrays, translation lookaside buffer (TLB) arrays, BTAC arrays, return stack arrays, etc., muxing out the direction or way (e.g., based on the tags), and reading out of the instructions.

The BTAC 14 holds information about previously executed branch instructions that it uses to predict the target address, direction, and type during subsequent executions. The BTAC 14 comprises one or more tables that are much larger than the table of the quick predictor 12. In one embodiment, the BTAC 14 comprises a 4 k entry, m-way set-associative table (also referred to herein as array or target array), where m is an integer greater than one. Each entry of the BTAC 14 comprises a valid bit, a branch target address prediction, a direction prediction, and a branch type. The branch type specifies whether the branch instruction is a call/return, indirect branch, conditional relative branch, or unconditional relative branch. In one embodiment, the BTAC 14 comprises or cooperates with a conditional relative branch predictor (or simply, conditional branch predictor) having a multiple entry (e.g., 12 k) tagged geometric (TAGE)-based conditional branch predictor, multiple tables, a multi-bit (e.g., 3 bit), taken/not taken (T/NT) counter, and multi-bit global branch history. That is, the TAGE conditional branch predictor comprises tagged tables with geometrically increasing branch history lengths, as is known. As another example, the indirect prediction comprises a multiple entry (e.g., 1.5 k) TAGE predictor and uses the table entries for static indirect branches. In one embodiment, two TAGE conditional branch predictors are used, one for side A and one for side B of a table. The TAGE conditional branch predictor may be part of the BTAC or used in conjunction with the BTAC 14. In one embodiment, the BTAC 14 comprises or cooperates with a second type of conditional branch predictor of lower complexity than the TAGE conditional branch predictor, for instance a gshare predictor associated with side C of the table. The gshare conditional branch predictor may be a part of the BTAC 14 or used in conjunction with the BTAC 14. The gshare conditional branch predictor comprises a complexity in between that of the quick predictor 12 and the TAGE conditional branch predictors (e.g., approximately $\frac{1}{10}^{th}$ the size of the TAGE conditional branch predictor). In one embodiment, the gshare conditional branch predictor comprises a single table (e.g., m-bit global history register comprising a branch pattern of the last m executed branch instructions, where m is typically 10-12 bits though not limited to that quantity). The gshare conditional branch predictor uses a global branch history and a location (e.g., IP) of a branch instruction to create (via an XOR logical operation) an index into a table of counters (e.g., 2-bit counters), where the result of the index is a prediction for the current branch. As TAGE and gshare type conditional branch predictors are known in the art, further description of the same is omitted here for brevity. Note that in some embodiments, other types of prediction mechanisms may be used, including correlation-based prediction mechanisms, conditional branch predictors that use a combination of global and local branch history, etc. Further, though sides A, B, and C are emphasized herein, in some embodiments fewer or additional sides may be used. For each portion, or fetch quantum, of a cache line of the instruction cache (e.g., 16 bytes), the BTAC 14 can hold three entries (e.g., sides A, B, and C, though fewer sides may be used in some embodiments for storing prediction information for fewer branch instructions) that can hold prediction information for up to three branch instructions that may be present in a portion of the cache line. The BTAC 14 comprises operations through a set of stages (e.g., the I, B and U stages). In effect, the U stage of a branch instruction serves as a C stage for the target (e.g., the arrow from the B stage to the C stage reflects the situation of the branch instruction at the B stage and the next clock is the C stage of the target or herein also, the cache address), resulting in a two-clock delay for BTAC prediction.

The BTAC 14 has a two clock taken penalty, which also reveals a benefit of the quick predictor 12 in providing a rapid branch prediction (no taken penalty) by immediately steering the new cache address to be the target. In one embodiment, the BTAC 14, being larger than the quick predictor 12 and having a more sophisticated branch prediction mechanism, is configured to (e.g., always) override the branch prediction of the quick predictor 12 when there is a disagreement in branch prediction (e.g., the BTAC 14 determines a different branch prediction than the taken determination and/or branch target address determined by the quick predictor 12). In some embodiments, the BTAC 14 is configured to update the quick predictor 12 during one of the BTAC stages (e.g., the U stage) by writing the branch prediction information into the table of the quick predictor 12 (and also in the tables of the BTAC 14). In some embodiments, updates to the BTAC 14 are delayed until a branch is executed or retired, where the updates to the BTAC 14 involve writes to the predictor tables of the BTAC 14. In one embodiment, updates involve target information and/or counter updates. The updates include a write of a mispredicted conditional branch information from the C side to either of the A or B side of the BTAC 14 and/or a conditional branch predictor array (depending on the cache replacement scheme) based on a configurable probability of chance, and a write from the A or B side to the C side of conditional branch information. However, updates to the quick predictor 12 do not wait that long, occurring during a BTAC stage. Note that branches that are not in the quick predictor 12 are written into the quick predictor 12 two cycles later at a time corresponding to (e.g., during) a BTAC stage.

The XIB 16 is a queue of entries, each of which holds sixteen bytes of data from the instruction cache. For instance, the cache data that comes from the XIB 16 is simply a stream of instruction bytes that comes in sixteen byte blocks, and it is unknown where a given x86 instruction begins or ends within the stream or within a given block given that instructions are of variable length. The XIB 16 comprises known logic to determine and mark the beginning and ending byte of each instruction within the stream and thereby break up the stream of bytes into a stream of x86 instructions, which is provided to and stored in the FIQ/loop queue 20 for processing by the remainder of the microprocessor pipeline. In the L (length) stage, the XIB 16 determines the instruction lengths. In one embodiment, a predecoder (not shown in FIG. 1A) is implemented at the U stage, and is configured to detect potential branch instructions and mark them as such for each instruction byte in the queues. Notably, at this stage, there is ambiguity as to whether a given byte is the start of an instruction. If a byte is an opcode byte of a branch instruction determined at a later (M stage), then the instruction is affirmed as a branch instruction. For instance, the branch decoder 18 comprises an instruction mux (not shown) for muxing instructions in a mux or M stage, where the branch instructions are affirmed as such.

In the F stage, the instructions are formatted. In one embodiment, the formatted instructions comprise instructions conforming substantially to the x86 architecture instruction set. Also, a determination is made at the M stage whether a given instruction, perhaps marked preliminarily by the predecoder, was indeed a branch or not. For instance, where a miss occurred in the quick predictor 12 or BTAC 14 (e.g., at initial start-up), the branch decoder 18 (e.g., the instruction mux) decides the current instruction is a branch and redirects at stage G the cache address to the new target and update the tables in the front end of the microprocessor 10. In effect, the branch decoder 18 provides for branch prediction when missed at the quick predictor 12 or BTAC 14, where the branch instruction transitions to the target at the C stage. In some circumstances, such as where there are more than a limited or predetermined maximum number of branches per fetch (e.g., more than three per 16 byte fetch) at the BTAC 14, branch prediction for the extra branch is delayed until decode time.

The FIQ/loop queue 20 receives the formatted instructions and buffers them until they can be translated into microinstructions. The FIQ/loop queue 20 also provides for a preliminary decoding and fast looping function (e.g., on a BTAC loop branch, the loop queue is activated and loop instructions are repeatedly sent), the latter represented by the arrow at the right hand side of the block 20.

The W stage provides for an optional extra timing clock.

At the X stage, the instruction translator 22 translates (in the X or translate stage) the formatted instructions stored in the FIQ/loop queue 20 into microinstructions.

The instructions are provided in program order to a register alias table/reservation tables (RAT/RS) 24. The RAT functionality of the RAT/RS 24 maintains and generates dependency information for each instruction. The RAT functionality of the RAT/RS 24 renames the sources and destinations of the instructions onto internal registers, and dispatches the instructions to reservation stations of the RAT/RS 24, which issue the instructions, potentially out of program order, to functional units 26. The functional or execution units 26, which include integer units, execute branch instructions at stage E (execution). Execution units, branch units, and integer units are terms that are used interchangeably herein. In one embodiment, the execution units 26 (e.g., two execution units) execute two branches in a single clock cycle. The execution units 26 also indicate whether the BTAC 14 has correctly predicted the branch instruction.

Results of the execution are provided in one embodiment to a reorder buffer (not shown), which comprises information pertaining to instructions that have been executed. As is known, the reorder buffer keeps the original program order of instructions after instruction issue and allows result serialization during a retire stage. In one embodiment, some of the information of the reorder buffer may be stored elsewhere along the pipeline, such as at the decoder 18. Information stored in the reorder buffer may include branch information, such as type of branch, branch patterns, targets, the tables used in the prediction, and cache replacement policy information (e.g., least recently used or LRU).

The branch table update 28 comprises stages S, W, Y, and Z, and is configured to update (e.g., at the S stage) the various tables at the front end (e.g., BTAC, TAGE) with information about the fully decoded and executed branch instruction (e.g., the final result of the branch). The update may involve, at stages S, W, Y, and Z, a table read, a target address write, and a counter increment or decrement, which may involve some delays. In one embodiment, the branch table update 28 provides an indication of a misprediction for a given conditional branch instruction and the side (e.g., A, B, or C) in which the conditional branch instruction is cached.

Figure 1B:
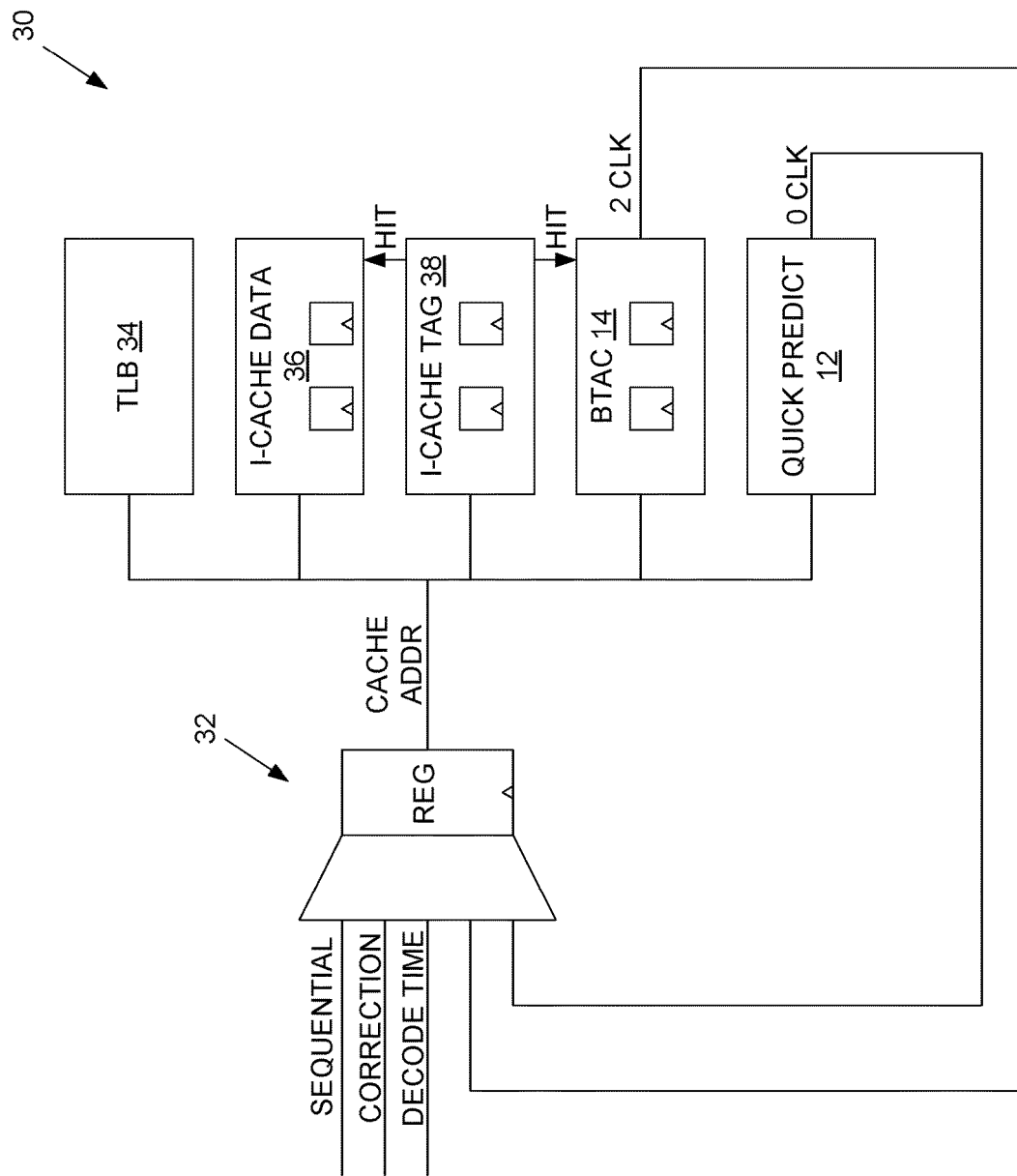
FIG. 1B is a schematic diagram showing an example front end of the branch unit pipeline shown in FIG. 1A.

Referring now to FIG. 1B, with continued reference to FIG. 1A, shown is an example quick predictor 12 and other example sources used at a front end 30 of the branch unit pipeline shown for the microprocessor 10 of FIG. 1A. The front end 30 comprises a fetch unit 32 (e.g., including a mux and clocked register), a translation lookaside buffer (TLB) 34, an instruction cache (I-cache data) 36, I-cache tag 38 (or tag array), the BTAC 14, and the quick predictor 12. The fetch unit 32 receives plural sources of cache instruction addresses, including a sequenced instruction address (e.g., from the I-stage), corrected instruction address (e.g., from the S stage), decode time instruction address (e.g., from the G stage), and addresses from the BTAC 14 and quick predictor 12. The output of the fetch unit 32 is a cache address that is provided as inputs to the TLB 34, I-cache data 36, I-cache tag 38, BTAC 14, and quick predictor 12 for accessing the next instruction of the I-cache data 36.

The TLB 34, under management by a memory management unit (not shown), provides for a virtual to physical page address translation as is known. That is, the TLB 34 stores the physical addresses of the most recently used virtual addresses. The TLB 34 receives a linear address from a segmentation unit (which converts the logical address from a program into the linear address), and a portion of the linear address is compared to the entries of the TLB 34 to find a match. If there is a match, the physical address is calculated from the TLB entry. If there is no match, a page table entry from memory is fetched and placed into the TLB 34.

The I-cache data 36 comprises a level 1 cache of instructions that have been fetched or prefetched from L2, L3 or main memory. The I-cache data 36 comprises multiple clocked registers.

The I-cache tag 38 comprises an array of tags corresponding to the instructions in the I-cache data 36, and comprises multiple clocked registers, and is used to determine a match between information associated with the fetched cache instruction (e.g., the tag or portion of the cache address) to the I-cache data 36 and BTAC 14.

The BTAC 14 is explained above in association with FIG. 1A, and has multiple clocked registers and a two (2) clock taken penalty. The quick predictor 12, also explained above, has a zero (0) clock taken penalty. For instance, assume fetches along the I-cache at 16 bytes per cycle, and assume a branch instruction at cache address 20 to cache address 95. Note that hexadecimal notation (e.g., 0x0, 0x10, 0x20, etc.) is implied by the address descriptions in this example. Thus, fetches occur at cache address 0, cache address 10, cache address 20 (the branch instruction, but not yet resolved since the BTAC 14 read and mux span multiple cycles, which in some embodiments is the same timing as the I-cache), cache address 30 (relative clock 1), cache address 40 (relative clock 2), and then on the $3^{rd}$ clock (relative clock 3), the cache instruction fetch is redirected to cache address 95. The taken branch penalty thus comprises two clock cycles in this example, since cache address 30 and 40 occur after the branch. In other words, without the quick predictor 12, the taken branch penalty is always two clocks for this particular design example. With the smaller and faster quick predictor 12, the cache address fetches, in the above example, comprise 0, 10, 20 and 95, with no delay on the cache address and zero taken penalty. As noted above, in some embodiments, the quick predictor 12 may be omitted.

Figure 2A:
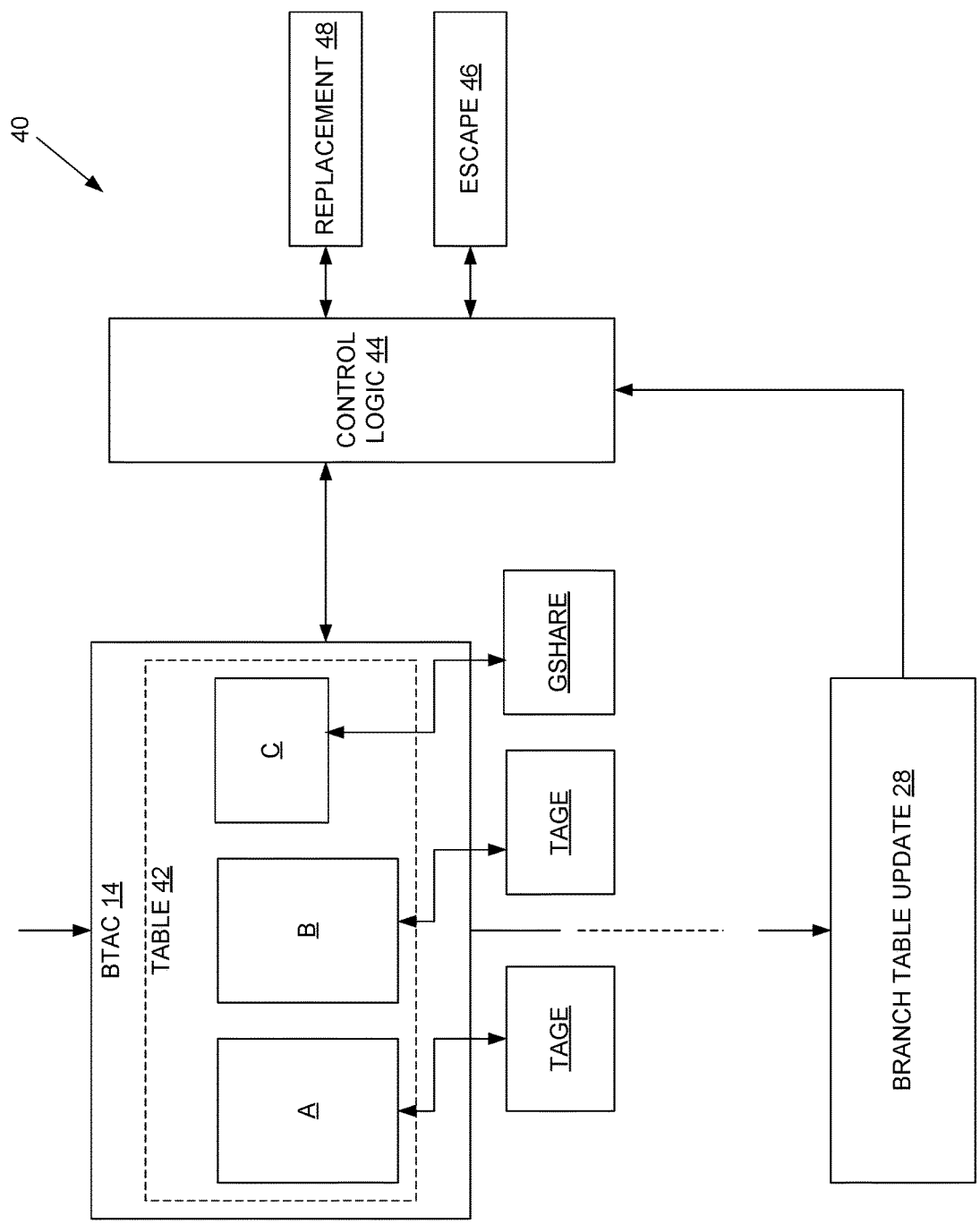
FIG. 2A is a schematic diagram that shows an embodiment of an example branch prediction control system.

Attention is now directed to FIG. 2A, which shows an embodiment of an example branch prediction control system 40. In one embodiment, the branch prediction control system 40 comprises the BTAC 14 comprising or coupled to a conditional branch table 42 (hereinafter, simply table), the branch table update 28, control logic 44, escape logic 46, and cache entry replacement logic 48. Note that other portions of the pipeline are omitted here for brevity, though it should be appreciated that the pipeline functions as described above in association with FIGS. 1A-1B. In some embodiments, fewer or additional components may be considered as comprising the prediction control system 40. In one embodiment, the table 42 comprises a first side (A), a second side (B), and a third side (C), each of the first and second sides A, B comprising a first conditional predictor having a group of multi-set associative tables (e.g., plural tables of different complexity global branch patterns, not shown), or more specifically for the present embodiment, TAGE conditional branch predictors (one for side A, one for side B), the third side comprising a conditional branch predictor (e.g., gshare conditional branch predictor) comprising a single predictor table. As explained above, each of the TAGE conditional branch predictors is of greater complexity than the gshare conditional branch predictor. Though depicted with a single table 42, it should be appreciated by one having ordinary skill in the art that both the BTAC 14 and the conditional branch predictors (TAGE, gshare) have a multi-sided table (each having sides A, B, and C). For instance, if a branch exists in side B of the BTAC 14, it also exists in side B of the conditional predictors. As shown in FIG. 2A, each of sides A, B of the table 42 have a separate TAGE conditional predictor, and side C has a gshare conditional branch predictor.

Digressing briefly, a gshare conditional branch predictor is used for side C, since two or more branches in a single cache line fetch is rare. The two TAGE conditional branch predictors are used for sides A and B, respectively of the conditional branch predictor table 42. In general, a first branch (and second branch) is assigned to sides A and B according to cache entry replacement logic 48, such as the least recently used (LRU). Sides A and B are independent and usually contain branches from different cache fetches. However, there may be circumstances where the gshare conditional branch predictor is used to handle a branch instruction that is more difficult to predict than the other branch instructions. For instance, the branch instruction in side C may have a more complex direction pattern that is taken every twenty-seventh time, or may have a direction pattern that has a repeated pattern of four taken followed by seven not taken. Other examples of more complex branch direction patterns may be contemplated by one having ordinary skill in the art. Such conditional branch instructions may also be critical to performance (e.g., a tight loop critical to performance), further compromising microprocessor performance, since the risk of mispredictions rises in these circumstances where a gshare conditional branch predictor is used. Without correction, mispredictions may recur over millions or billions of cycles resulting in a corresponding overall slow-down in performance (e.g., up to approximately 20% performance decrease). The branch prediction control system 40 addresses at least these circumstances by using the control logic 44 to escape conditional branch prediction from side C and write the offending branch instruction, according to a given chance or probability, to side A or side B, where the TAGE conditional branch predictors are more suited to handling the more complex branch instructions.

As shown in FIG. 2A, the branch table update 28 provides information to the control logic 44, including whether a given conditional branch instruction is mispredicted and whether the offending (mispredicted) conditional branch instruction is in side C. The control logic 44 cooperates with the escape logic 46 and the cache entry replacement logic 48 to write branch instructions to the sides A, B, or C. In one embodiment, the escape logic 46, described further below in association with FIG. 2B, comprises a pseudo-random generator that is used to provide an escape trigger to the control logic 44 to write (a certain percentage of times) the mispredicted branch instruction entries to sides A or B. The cache entry replacement logic 48 comprises an array that utilizes one of a plurality of known cache entry replacement schemes. For instance, in one embodiment, a least recently used (LRU) replacement algorithm is used. The control logic 44 controls an address mux (not shown) to select an update address when a conditional branch in the table 42 (e.g., in side C) is being written to sides A or B and when a conditional branch in side A or side B is being written to side C. The cache entry replacement logic 48 stores replacement information for each of the sides A, B, and C. Thus, the cache entry replacement logic 48 is a global resource shared between the sides of the table 42. In one embodiment, the replacement information includes bits for indicating which of the sides and which of the ways of each side was least recently used, which the control logic 44 uses to perform the writes to the table 42. The control logic 44 also controls updates to the LRU array of the cache entry replacement logic 48.

Figure 2B:
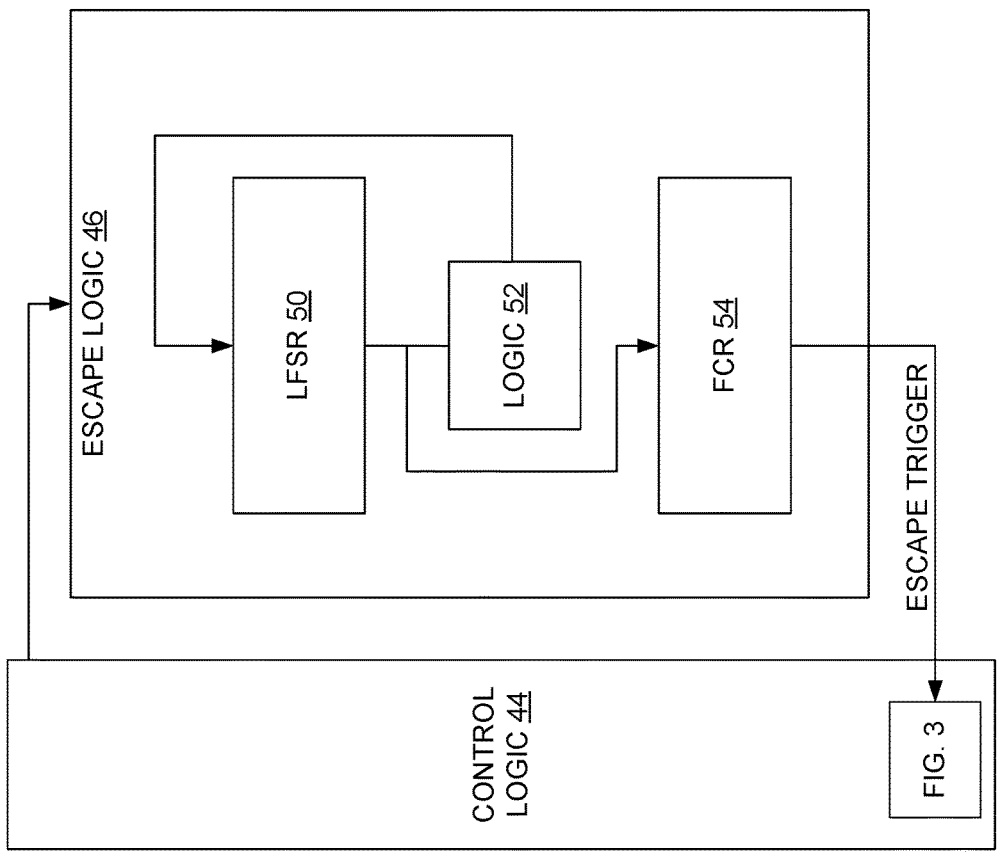
FIG. 2B is a schematic diagram that shows an embodiment of an example escape logic used in the branch prediction control system of FIG. 2A.

With continued reference to FIG. 2A, attention is directed to FIG. 2B, which shows an embodiment of the escape logic 46. It should be appreciated by one having ordinary skill in the art from the present disclosure that the example escape logic 46 shown in FIG. 2B is one illustrative example, and that in some embodiments, a different circuit may be used to perform a similar function. The escape logic 46 is generally configured to generate a pseudo-random escape trigger, a configurable percentage of the time. In one embodiment, the escape logic 46 comprises a linear feedback shift register (LFSR) 50, processing logic 52, and a feature control register (FCR) 54. In one embodiment, the LFSR 50 comprises seven (7) bits that are fed to the processing logic 52, which in one embodiment comprises an inverter. Note that the use of seven bits is merely illustrative of one example, and in some embodiments, other size registers may be used. In effect, the LFSR 50 and processing logic 52 produce every possible value for 7 bits (e.g., cycles through all of the 2^7 states (except all zeroes) in pseudo-random order). A portion of the bits (e.g., a 5-bit sample, though not limited as such) is provided to the FCR 54, which selects one of a plurality of chance or probability values for which the escape or write from side C to sides A or B (e.g., depending on the LRU scheme) is to be triggered. In one embodiment, the FCR 54 is configurable (e.g., via a physical or software/microcode adjustment) to enable a chance or probability of an escape trigger of 1/128, 1/32, 1/8, or even zero (off). Note that all or a portion of these and/or other values or ratios may be used in some embodiments. For instance, in the case of a setting of 1/32, there is an escape trigger (provided to the control logic 44) to enable a side C escape randomly about 3% of the time. This random mechanism is in contrast to a simple counter that triggers every 32 cycles, since the escape logic 46 provides this trigger in a random manner (which avoids possible symmetry with the programming code that prevents an escape from ever occurring).

Figure 3:
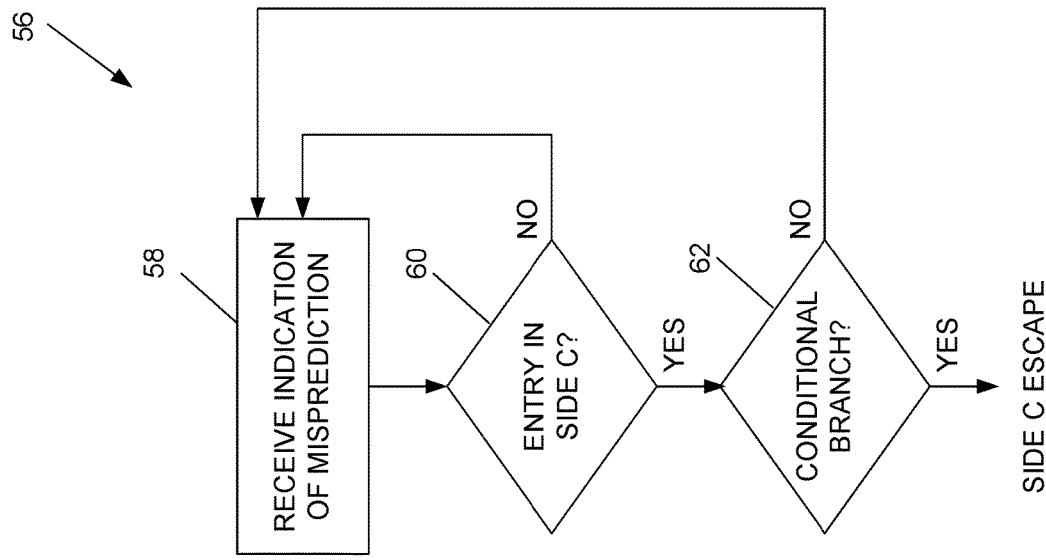
FIG. 3 is a flow diagram that shows an embodiment of a branch prediction control method.

In view of the above description, it should be appreciated by one having ordinary skill in the art that one branch prediction control method, denoted method 56 in FIG. 3 and implemented in one embodiment by the control logic 44, comprises receiving an indication of a misprediction for a branch instruction (58). The method 56 determines if the mispredicted branch instruction is an entry in side C (60). If not ("No" to 60), the method 56 continues to monitor for mispredicted branch instructions. If so ("Yes" to 60), the method 56 determines whether offending branch instruction is a conditional branch instruction (62), and returns to 58 if not ("No" to 62) and if so ("Yes" to 62), implements a side C escape using the escape logic 46 described above in association with FIG. 2B. It should be appreciated that in some embodiments, steps of the method 56 may be switched in order or performed in parallel.

Figure 4:
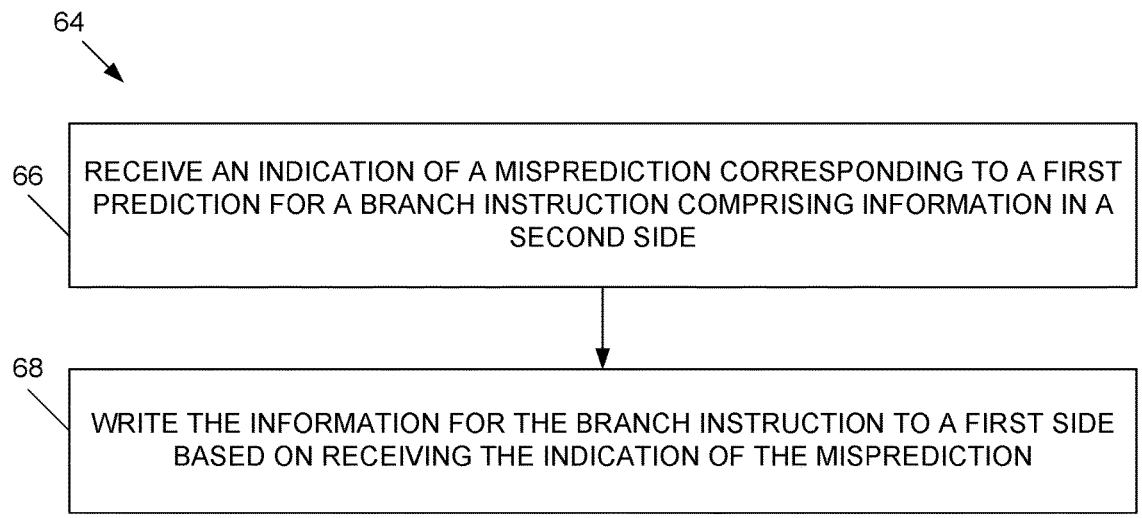
FIG. 4 is a flow diagram that shows an embodiment of an example branch prediction control method.

Having described certain embodiments of a branch prediction control system 40 (FIG. 2A) and method 56 (FIG. 3), it should be appreciated that one embodiment of a branch prediction control method, denoted as method 64 in FIG. 4, is implemented in a microprocessor having a table comprising multiple sides, wherein at least a first side of the multiple sides comprises a first conditional branch predictor having a first set of prediction tables, wherein at least a second side of the multiple sides comprises a second conditional branch predictor having a second set of prediction tables, wherein the first conditional branch predictor is of greater complexity than the second conditional branch predictor. The branch prediction control method 64 comprises receiving an indication of a misprediction corresponding to a first prediction for a branch instruction comprising information in the second side (66); and writing the information for the branch instruction to the first side based on receiving the indication of the misprediction (68).

Figure 5:
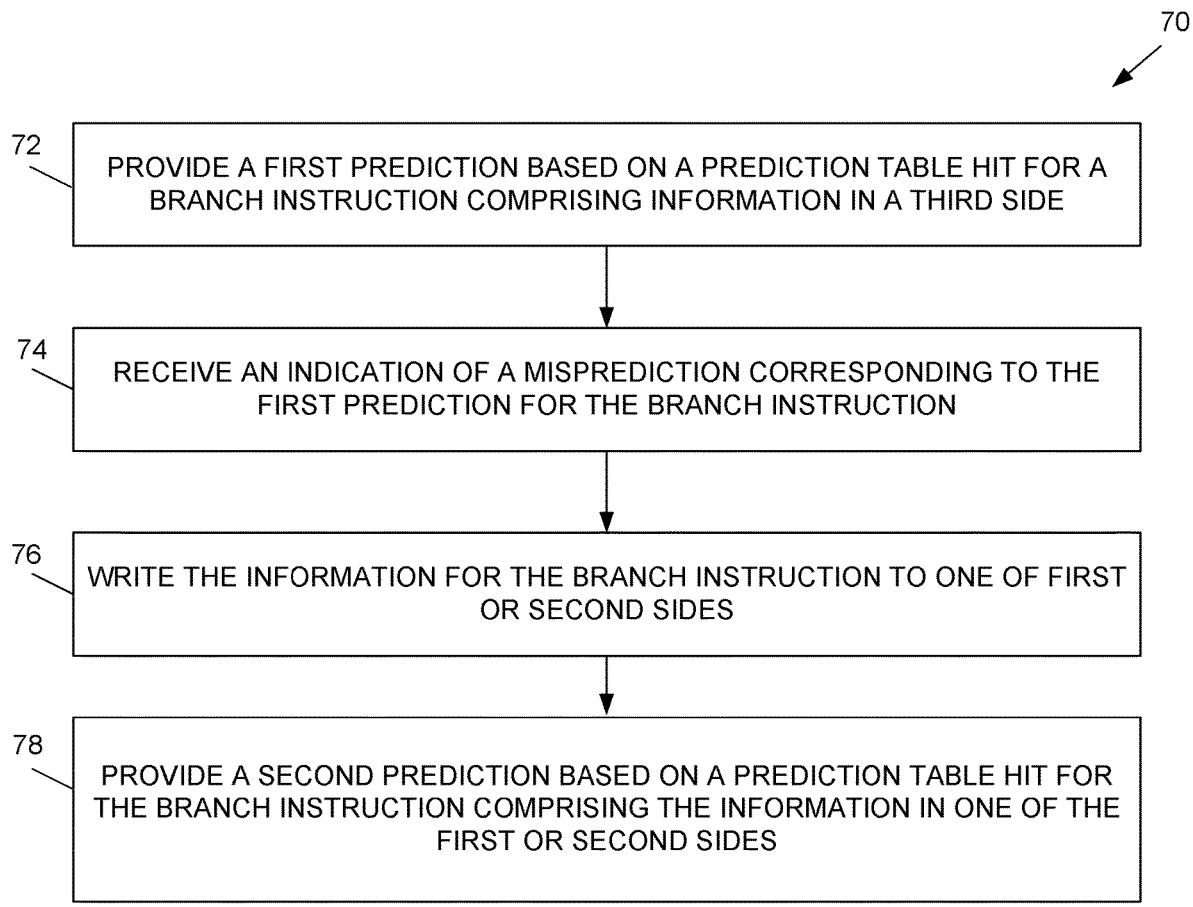
FIG. 5 is a flow diagram that shows an embodiment of another example branch prediction control method.

It should be appreciated in view of the above description that yet another embodiment of a branch prediction control method, denoted as method 70 in FIG. 5, is implemented in a microprocessor having a table comprising a first side, a second side, and a third side, each of the first and second sides comprising a first conditional branch predictor having a group of multi-set associative tables, the third side comprising a second conditional branch predictor having a single table, wherein each of the first conditional branch predictors is of greater complexity than the second conditional branch predictor. The branch prediction control method comprises providing a first prediction based on a prediction table hit for a branch instruction comprising information in the third side (72); receiving an indication of a misprediction corresponding to the first prediction for the branch instruction (74); writing the information for the branch instruction to one of the first or second sides (76); and providing a second prediction based on a prediction table hit for the branch instruction comprising the information in one of the first or second sides, wherein based on the write to one of the first or second sides, a quantity of mispredictions for subsequent prediction table hits of the branch instruction is reduced (78).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A microprocessor, comprising:
a table comprising multiple sides, wherein at least a first side comprises a first conditional branch predictor having a first set of prediction tables, wherein at least a second side comprises a second conditional branch predictor having a second set of prediction tables,
wherein for a given cache line fetch comprising at least a first branch instruction and a second branch instruction, the second conditional branch predictor is configured to provide a first branch prediction for the first branch instruction; and
wherein the first conditional branch predictor is of a greater complexity than the second conditional branch predictor; and
hardware control logic, wherein based on receiving an indication of a misprediction corresponding to the first branch prediction for the first branch instruction, the hardware control logic is configured to write a branch prediction entry for the first branch prediction to the first side.

2. The microprocessor of claim 1, further comprising pseudo-random generator logic configured to provide a trigger signal that prompts the write by the hardware control logic, the trigger signal provided according to a configurable probability.

3. The microprocessor of claim 2, wherein the configurable probability comprises one of a plurality of possible ratios.

4. The microprocessor of claim 1, wherein the first conditional branch predictor is configured to provide a second branch prediction for the second branch instruction.

5. The microprocessor of claim 4, wherein based on the write to the first side, the write to the first side to one of the first set of prediction tables, a quantity of mispredictions for subsequent instances of the first branch instruction is reduced.

6. The microprocessor of claim 1, wherein the second conditional branch predictor comprises a single prediction table, the second conditional branch predictor comprising a gshare predictor.

7. The microprocessor of claim 1, wherein the first conditional branch predictor comprises plural branch predictor tables of different branch history lengths, the first conditional branch predictor comprising a tagged geometric (TAGE) predictor.

8. The microprocessor of claim 7, further comprising a second TAGE predictor for a third side of the multiple sides.

9. The microprocessor of claim 1, wherein the hardware control logic is further configured to write a branch prediction entry corresponding to another branch instruction to the second side at a time corresponding to the write to the first side.

10. The microprocessor of claim 9, wherein selection of the branch prediction entry corresponding to the another branch instruction to write to the second side is based on one of a plurality of different cache entry replacement schemes.

11. A branch prediction control method implemented in a microprocessor having a table comprising multiple sides, wherein at least a first side of the multiple sides comprises a first conditional branch predictor having a first set of prediction tables, wherein at least a second side of the multiple sides comprises a second conditional branch predictor having a second set of prediction tables, wherein the first conditional branch predictor is of greater complexity than the second conditional branch predictor, the branch prediction control method comprising:
receiving an indication of a misprediction corresponding to a first branch prediction for a first branch instruction; and writing a branch prediction entry for the first branch instruction to the first side based on receiving the indication of the misprediction.

12. The branch prediction control method of claim 11, wherein writing is further based on receiving a pseudo-random generator based trigger signal that is provided according to a configurable probability.

13. The branch prediction control method of claim 12, wherein the configurable probability comprises one of a plurality of possible ratios.

14. The branch prediction control method of claim 11, further comprising writing a branch prediction entry corresponding to another branch instruction to the second side at a time corresponding to the write to the first side.

15. The branch prediction control method of claim 14, wherein selection of the branch prediction entry corresponding to the another branch instruction to write to the second side is based on one of a plurality of different cache entry replacement schemes.

16. A branch prediction control method implemented in a microprocessor having a table comprising a first side, a second side, and a third side, each of the first and second sides comprising a first conditional branch predictor having a group of multi-set associative tables, the third side comprising a second conditional branch predictor having a single table, wherein each of the first conditional branch predictors is of greater complexity than the second conditional branch predictor, the branch prediction control method comprising:
 for a given cache line fetch comprising a first branch instruction, a second branch instruction, and a third branch instruction:
 providing a first branch prediction for the first branch instruction using the second conditional branch predictor;
 receiving an indication of a misprediction corresponding to the first branch prediction;
 writing a branch prediction entry for the first branch instruction to one of the first or second sides; and
 providing a second branch prediction for a subsequent instance of the first branch instruction using the first conditional branch predictor of the one of the first or second sides.

17. The branch prediction control method of claim 16, wherein the second conditional branch predictor comprises a gshare predictor.

18. The branch prediction control method of claim 16, wherein each of the first conditional branch predictors comprises a tagged geometric (TAGE) predictor.

* * * * *